United States Patent [19]
Larsen

[11] Patent Number: 5,570,007
[45] Date of Patent: Oct. 29, 1996

[54] METHOD AND APPARATUS FOR STATIC VAR COMPENSATOR VOLTAGE REGULATION

[75] Inventor: Einar V. Larsen, Charlton, N.Y.

[73] Assignee: General Electric Company, Schenectady, N.Y.

[21] Appl. No.: 154,480

[22] Filed: Nov. 19, 1993

Related U.S. Application Data

[63] Continuation-in-part of Ser. No. 88,555, Jul. 9, 1993, abandoned.

[51] Int. Cl.[6] .................................................. G05F 1/70
[52] U.S. Cl. ............................................................ 323/209
[58] Field of Search ................................. 323/209, 210, 323/211

[56] References Cited

U.S. PATENT DOCUMENTS 4,204,151  5/1980  Gyugyi et al. ............................ 323/210

OTHER PUBLICATIONS

"Digital Control of SVC Plants", Wild et al, Mar. 1989.
"Precommissioning and Preliminary Control System Test Results for the Kemps Creek Static VAR Compensators, Australia", Henner et al, Mar. 1990.
"Improved SVC Control", General Electric Company, Jul. 1990.

*Primary Examiner*—Peter S. Wong
*Assistant Examiner*—Y. J. Han
*Attorney, Agent, or Firm*—Nixon & Vanderhye P.C.

[57] ABSTRACT

A voltage regulator regulates the voltage a static VAR compensator (SVC) supplies to a power supply network. An SVC status detector detects the conducting status of the SVC thyristors and generates the measured SVC susceptance in accordance with that conduction status. A calculator calculates a representative voltage, (i.e. the Thevenin equivalent), of the power supply network based on the measured SVC susceptance, measured SVC voltage, and an estimate of the power supply network's equivalent reactance. An ordered susceptance to be provided by the SVC to maintain the SVC voltage at a desired level is predicted based on the calculated voltage. A firing control unit receives the predicted susceptance value and calculates drive signals for controlling thyristors in the SVC. The equivalent reactance is initially estimated, and thereafter, it is modified automatically to track and compensate for large disturbances in the power transmission network. The modification is determined based on changes in the calculated representative voltage and in the measured SVC susceptance. The equivalent reactance is varied until the changes in the calculated representative voltage and measured SVC susceptance are substantially reduced to zero. This Thevenin-based approach to modelling the power supply network from the perspective of the SVC permits predictive SVC voltage regulation that is sensitive, accurate, and stable.

60 Claims, 17 Drawing Sheets

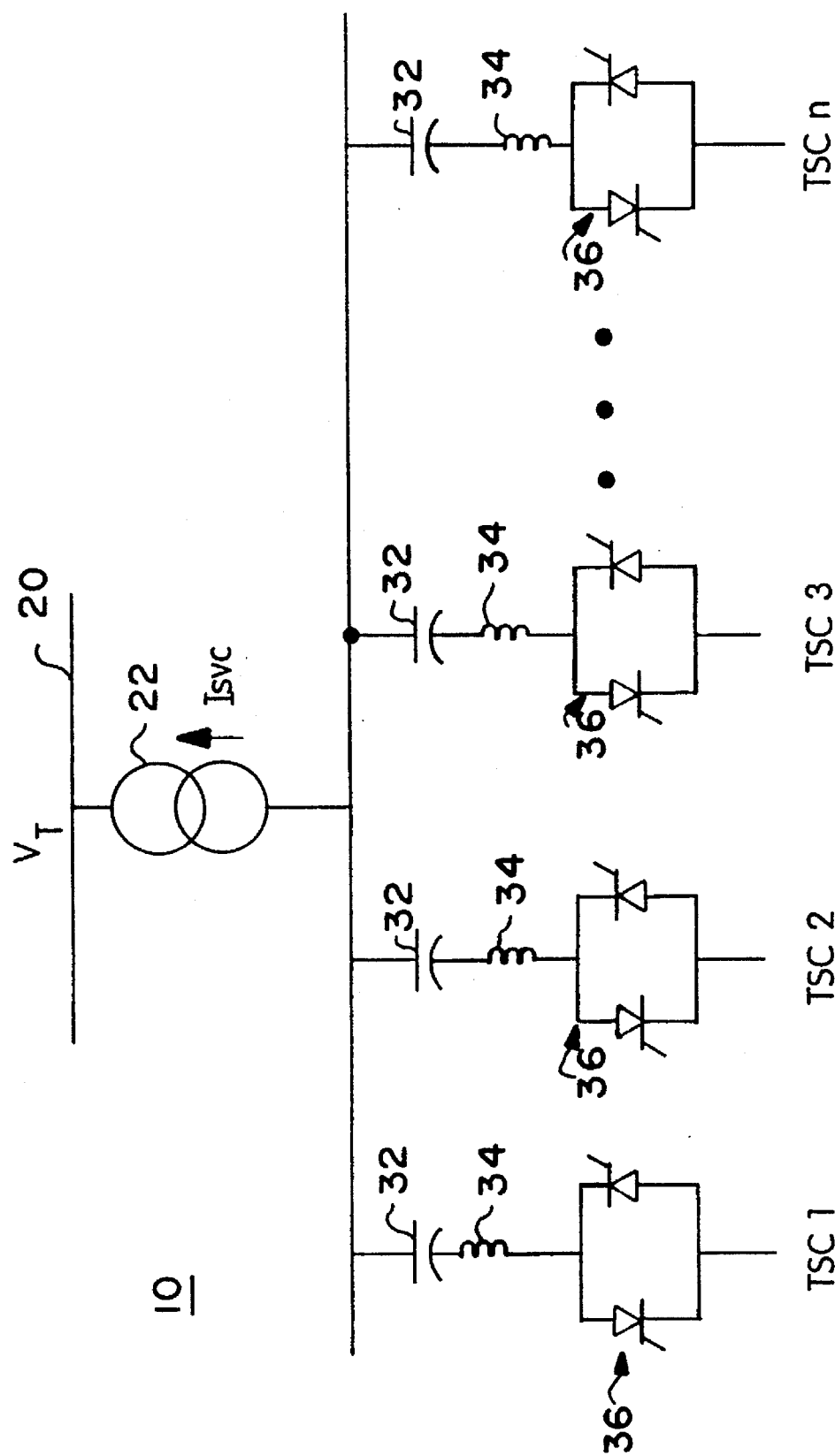
FIG. 1 *(PRIOR ART)*

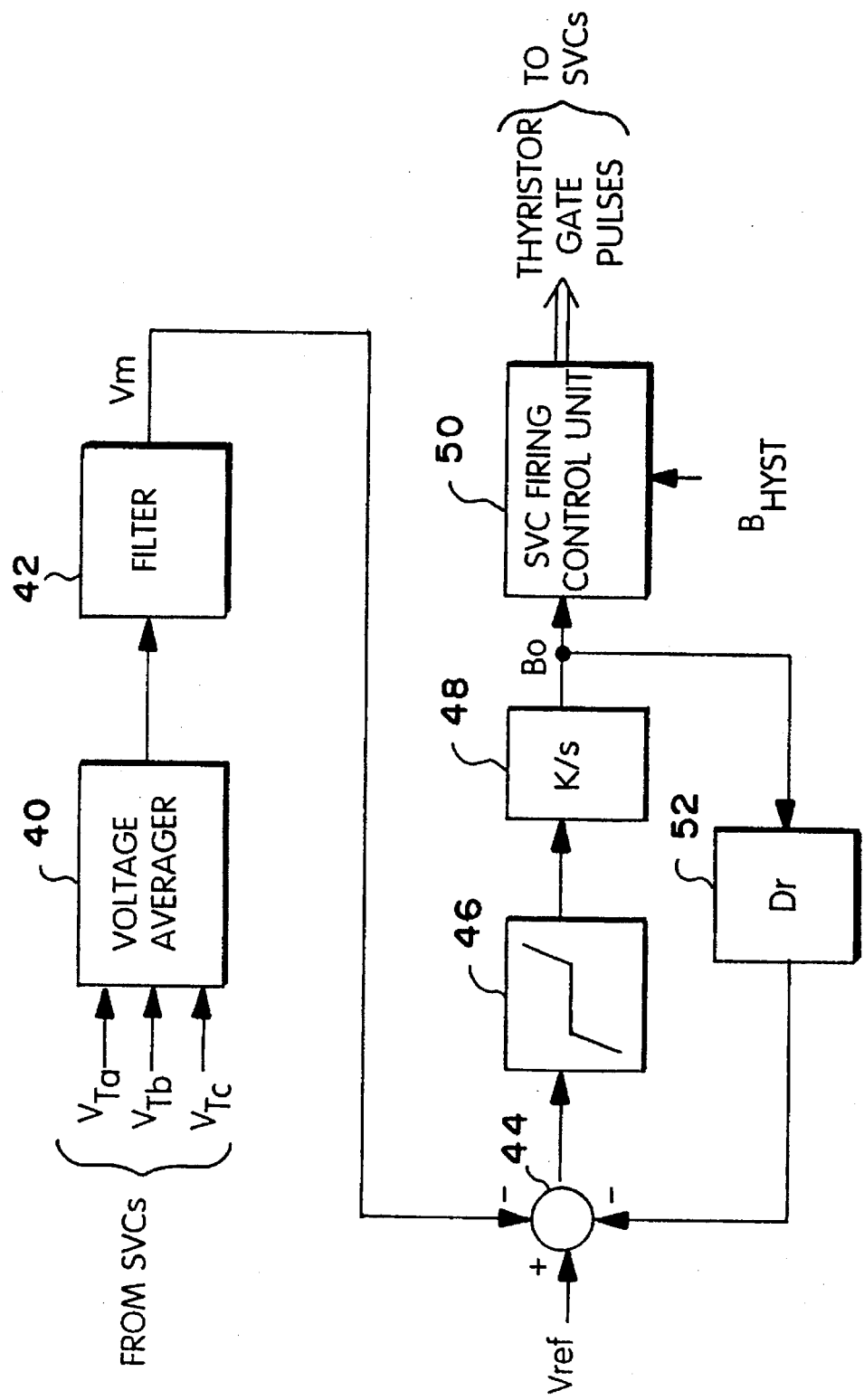
FIG. 2 *(PRIOR ART)*

FIG. 3(a)
(PRIOR ART)
FIG. 3(b)
(PRIOR ART)
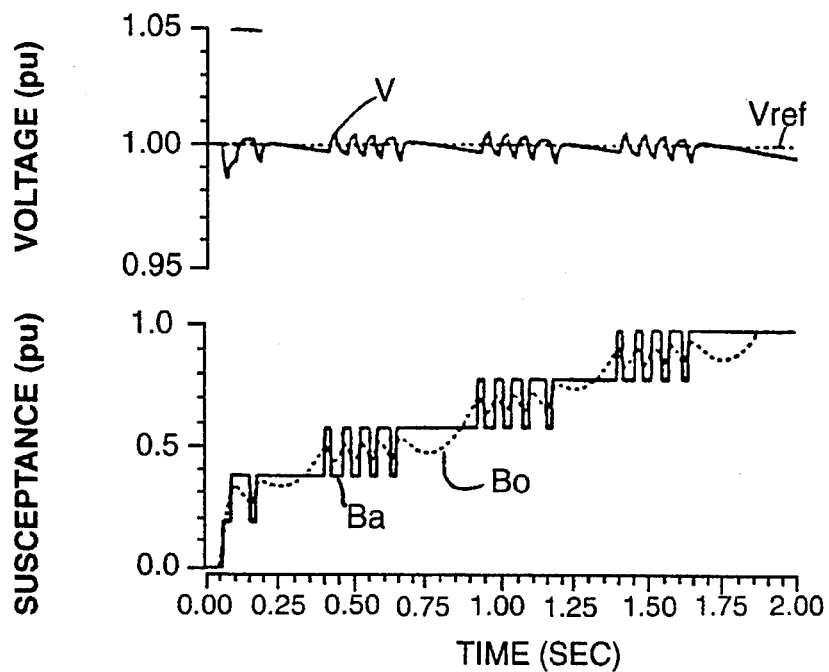
FIG. 3(c)
(PRIOR ART)
FIG. 3(d)
(PRIOR ART)
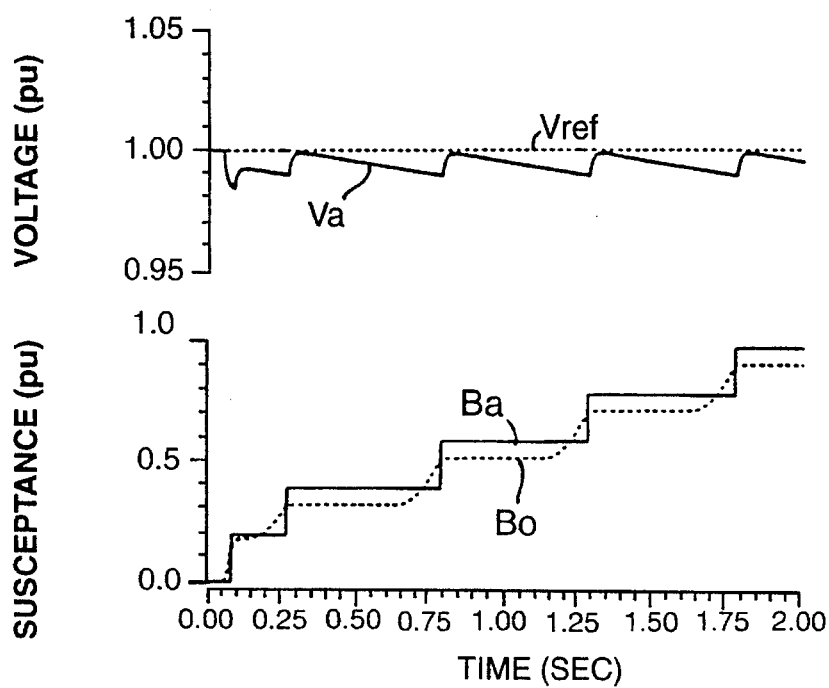

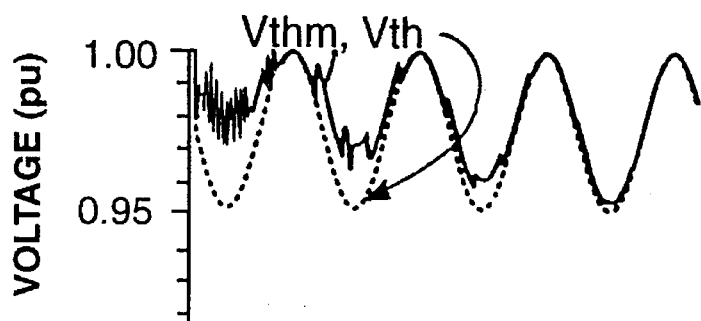
FIG. 11(a)
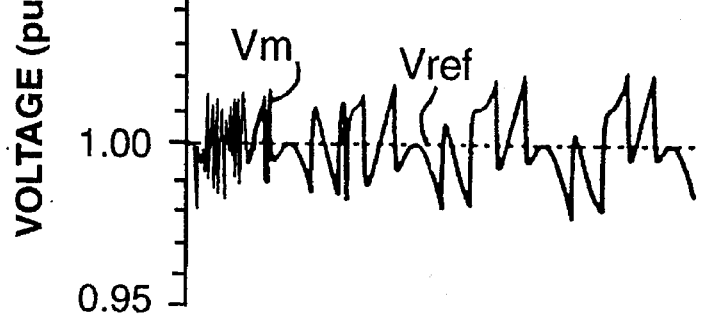
FIG. 11(b)
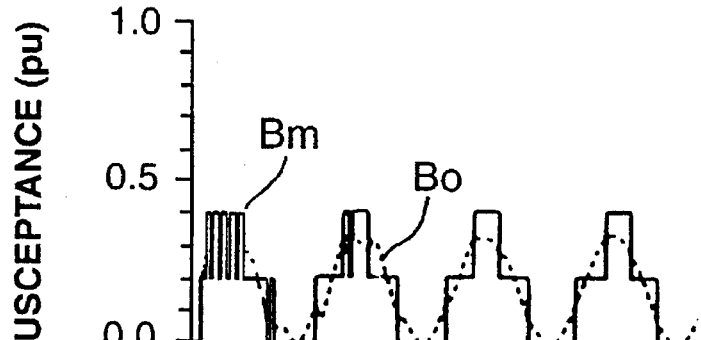
FIG. 11(c)
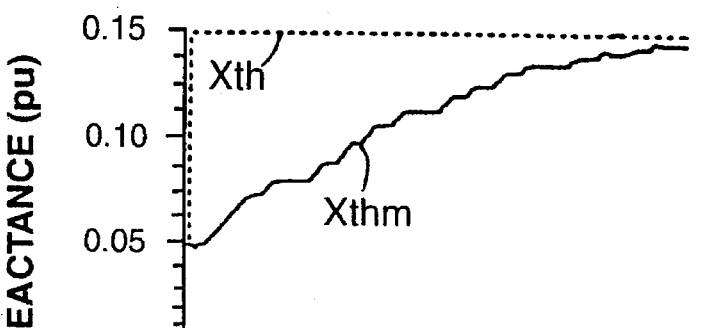
FIG. 11(d)
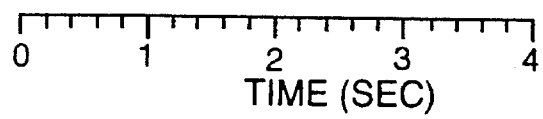

METHOD AND APPARATUS FOR STATIC VAR COMPENSATOR VOLTAGE REGULATION

RELATED APPLICATIONS

This application is a continuation-in-part of U.S. application Ser. No. 08/088,555 filed on Jul. 9, 1993, the disclosure of which is incorporated herein by reference now abandoned.

FIELD OF THE INVENTION

The present invention relates to voltage regulation of static VAR compensators (SVCs) used to vary reactive power in AC power systems. More particularly, the present invention describes a voltage regulator that regulates SVC voltage based on an equivalent circuit that models the AC power system as viewed from the SVC to achieve fast, sensitive, and stable response to changes in the system's reactive power needs.

BACKGROUND AND SUMMARY OF THE INVENTION

Reactive compensators, often referred to as Static VAR compensators (SVC), control voltage and provide reactive power in AC power transmission systems. Practical applications of SVCs include maintaining voltage at or near a constant level under slowly varying conditions in response to load changes, correcting voltage changes caused by unexpected events (e.g., load rejections, generator and line outages, etc.), and reducing voltage flicker caused by rapidly fluctuating system loads. SVCs may also be used to improve power system stability, power factor, and current phase imbalance. Controlled switching of reactive elements in the SVC regulates the amount of capacitive/inductive loading applied to its AC transmission lines thereby modifying the reactive power delivered by the power generation system.

An exemplary SVC 10 is illustrated in FIG. 1 and includes plural thyristor-switched capacitors (TSCs). AC filters and thyristor-controlled reactors (TCR) are examples of other reactive compensators. FIG. 1 is a conventional one line power generation diagram for representing a single phase of a typical three phase AC power supply network. Five thyristor-switched capacitors (TSC1-TSC5) are shunt-connected across one phase of the AC power supply network to the transmission line 20 through a conventional reactive transformer 22. Of course, any number of TSCs, TCRs, etc. could be included in SVC 10. Each TSC typically includes in series a capacitor 32, a surge inductor 34, and a thyristor valve 36. Each thyristor valve 36 includes anti-parallel thyristors which are controlled by externally generated firing signals (not shown). $V_T$ is the single phase SVC voltage on transmission line 20. $I_{SVC}$ is the current flowing from the SVC 10 to the transmission line 20.

FIG. 2 shows a block diagram of a conventional, closed loop, SVC voltage regulator used to generate thyristor gate pulses to activate and deactivate the thyristors 36 to generate the SVC reactive current $I_{SVC}$ at appropriate times. Using conventional voltage measuring devices, i.e. volt meters (not shown), $V_T$ is measured for each of the three phases A, B and C of the three phases in the AC power system and averaged with the other phase voltages in a conventional voltage averaging unit 40. The average SVC voltage is then filtered in conventional ripple filter 42 to remove harmonic AC ripple, in particular at the six harmonic, and generate measured SVC voltage Vm. This feedback SVC voltage Vm is then compared with a desired reference voltage Vref in summer 44 which generates a difference or error signal. The goal of the voltage regulator is, of course, to cause the SVC voltage Vm to move toward and be maintained by the desired voltage Vref.

The error is initially processed in the control loop by conventional deadband circuit 46 which desensitizes the control system response to relatively small changes in Vm. Unless the magnitude of the error signal is greater than some deadband threshold amount, no signal is output from deadband circuit 46 and no control action occurs. As will be illustrated below, desensitization is necessary to stabilize the system response and prevent unnecessary, oscillatory firing of the SVC thyristors. An integrator K/s 48, (where constant K has units of measurement MVARS/sec/unit voltage error), integrates the output signal from the deadband circuit 46 and generates a commanded susceptance Bo. The commanded susceptance Bo is processed in a conventional SVC firing control unit 50 which, based on Bo, determines the appropriate thyristor gate pulses for turning the TSC thyristors "on" so that the SVC provides reactive current ISVC to transmission line 20. This added reactive current causes the measured transmission line voltage at the SVC bus to move back toward the desired voltage Vref.

The SVC firing control unit 50 also may incorporate a hysteresis compensation factor $B_{HYST}$ which compensates for the practical hysteresis effects that delay the control system response to the newly commanded susceptance Bo. In effect, this hysteresis factor sets the commanded susceptance Bo at a constant value for a sufficient period of time to ensure that the system has had an opportunity to respond to the commanded direction before the current Bo command is removed or otherwise modified.

Instead or in combination with the deadband circuit 46, a slope setting unit 52 may be included in the secondary feedback loop feeding the commanded susceptance Bo back to summer 44 after multiplying it by a "droop" factor Dr. In essence, this secondary feedback input desensitizes the responsiveness of the primary feedback loop depending upon how much the susceptance Bo has changed. As a result, a large ordered susceptance (representative of a change in system demands) tends to decrease the difference or error output by summer 44.

Thus, by controlling either or both the deadband circuit 46 or the slope setting unit 52, the sensitivity of the conventional closed loop controller may be increased. To illustrate the need for desensitizing the control response of a conventional SVC voltage regulator, reference is made to FIGS. 3(a) and 3(b) which shows an exemplary high sensitivity response, i.e. without deadband or droop. A reference SVC voltage Vref (the dotted line) and the actual measured SVC voltage Vm (the solid trace) are plotted in per unit (pu) voltage against time in seconds. Although the goal of the SVC voltage regulator is to maintain Vm as close to Vref as possible, this is difficult to do in practice as reactive power (e.g. susceptance) is added to the power supply system. FIG. 3(b) shows susceptance B being supplied to the power system increasing in approximately stepwise fashion from 0.0 to 1.0 pu mhos during the period 0.00 seconds to 1.75 seconds. The ordered value of susceptance Bo is shown as the dotted trace and the actual value of SVC susceptance Ba is shown as a solid trace.

Each step increase or new command of Bo, i.e. at 0.05 seconds, 0.40 seconds, 0.95 seconds, and 1.35 seconds, generates an oscillating response of considerable duration referred to as "chatter" in SVC voltage Vm and susceptance.

Chatter is caused by the system continually responding too far in one direction and then over correcting in the opposite direction thereby generating extended periods of overcompensating oscillatory corrections.

Such local oscillations can be reduced to some extent using deadband unit 46 and slope setting unit 52 in a conventional SVC voltage regulator as shown in FIGS. 3(c)–3(f). FIGS. 3(c) and 3(d) illustrate the system response when deadband unit 46 is activated. The addition of deadband eliminates the chatter observed in the high sensitivity example shown in FIGS. 3(a)–3(b). However, Ba is offset from Bo, and Vm is offset from Vref for considerable periods after each commanded change in susceptance Bo. FIGS. 3(e) and 3(f) also show reduced chatter when the slope setting unit 52 is activated. Unfortunately, the offsets between the measured and ordered values of both voltage and susceptance are even larger than those associated with deadband.

For additional discussion of conventional SVC closed loop control systems with gain supervision, desensitization, and hysteresis adjustment to ensure stability of local oscillations, see "Digital Control of SVC Plants," by Wild et al, Canadian Electric Association, March, 1989, Toronto, and "Pre-Commissioning and Preliminary Control System Test Results for the Kemps Creek Static Bar Compensators, Australia," Henner et al, Canadian Electric Association meeting, March, 1989, Montreal.

Conventional closed loop control provides mechanisms for stabilizing local oscillations in SVC voltage regulators. Unfortunately, stability is achieved at the cost of accuracy and speed in response to changes in reactive power demands. Accordingly, what is needed is an improved SVC voltage regulator that regulates the voltage at the SVC bus to achieve sensitive and stable response to changes in the reactive power needs of the power supply network.

The present invention provides such a voltage regulator for regulating the voltage of a static VAR compensator (SVC) connected to a power supply network. An SVC status detecting means detects the conduction status of the SVC thyristors and generates the measured SVC susceptance in accordance with that conduction status. A calculator calculates a representative voltage that is the Thevenin equivalent of the power supply network based on the measured SVC susceptance, measured SVC voltage, and an estimate of the power supply network's equivalent reactance. A predictor then predicts an ordered susceptance that should be provided by the SVC based on the representative voltage to maintain the SVC voltage at a desired level. A firing control unit receives the predicted susceptance value and calculates appropriate drive signals for controlling thyristors in the SVC to thereby deliver sufficient reactive current to the power network in accordance with the ordered susceptance.

Another embodiment of the present invention includes a voltage regulator for a static VAR compensator (SVC) switchably connected to a power supply network at a bus. The voltage regulator includes means for measuring a susceptance delivered by the SVC to the power supply network; means for measuring an SVC voltage at the bus; means for modelling the power supply network using an equivalent network including an equivalent voltage and an equivalent reactance, the equivalent voltage being determined based on the estimate of the equivalent reactance, the measured SVC susceptance, and the measured SVC bus voltage; means for predicting a desired SVC susceptance based on the equivalent voltage and a reference SVC bus voltage; and means for controlling switching of the SVC based on the predicted SVC susceptance.

A method according to the present invention includes the steps of measuring the SVC voltage; determining an equivalent of the power supply network voltage based on the reactive power delivered to the network by the SVC, the measured SVC bus voltage, and an estimate of the power supply network's reactance; predicting a desired reactance to be delivered by the SVC based on the determined power supply network voltage; generating SVC control signals based on the predicted reactance; activating the SVC in accordance with the control signal; detecting the activation status of the SVC; and generating a measured reactance in accordance with the detected SVC activation status. The measured reactance is representative of the reacted power delivered to the power supply network.

In another embodiment of the present invention, after the equivalent reactance is initially estimated, it is thereafter modified automatically to track and compensate for large disturbances in the power transmission network. This modification is determined based on changes in the calculated representative voltage and in the measured SVC susceptance via a correlation procedure. These correlations are accumulated and used to adjust the estimate of Thevenin reactance until the correlated changes in the representative voltage (due to changes in the measured SVC susceptance) are reduced to zero. The means for tracking changes in the representative voltage and measured SVC susceptance and the means for automatically modifying the estimate of the equivalent reactance in response to those changes permit the present invention to adapt to severe power system contingency conditions.

This Thevenin-based approach to modelling the power supply network from the perspective of the SVC permits predictive SVC voltage regulation that is sensitive, accurate, and stable. These and other objects, features, and advantages of the present invention will become aware to those skilled in the art from the following description and drawings in which:

BRIEF DESCRIPTION OF THE DRAWINGS

FIG. 1 is a one line diagram of a typical static VAR compensator (SVC) for one phase of a three phase power supply system;

FIG. 2 is a block diagram of a conventional SVC closed loop voltage regulator;

FIGS. 3(a)–3(f) are graphs showing the response of conventional SVC voltage regulators at different sensitivity settings;

FIGS. 11(a)–11(d) are graphs illustrating automatic increase of the estimate of Xthm when system impedance triples in response to a severe power system disturbance.

DETAILED DESCRIPTION OF THE DRAWINGS

In the following description, for purposes of explanation and nonlimitation, specific details are set forth, such as particular circuits, circuit components, techniques, etc. in order to provide thorough understanding of the present invention. However, those skilled in the art will recognize that the present invention may be practiced in other embodiments that depart from these specific details. In other instances, detailed descriptions of well known methods, devices, and circuits are omitted so as not to obscure the description of the present invention with unnecessary detail.

Figure 4A:
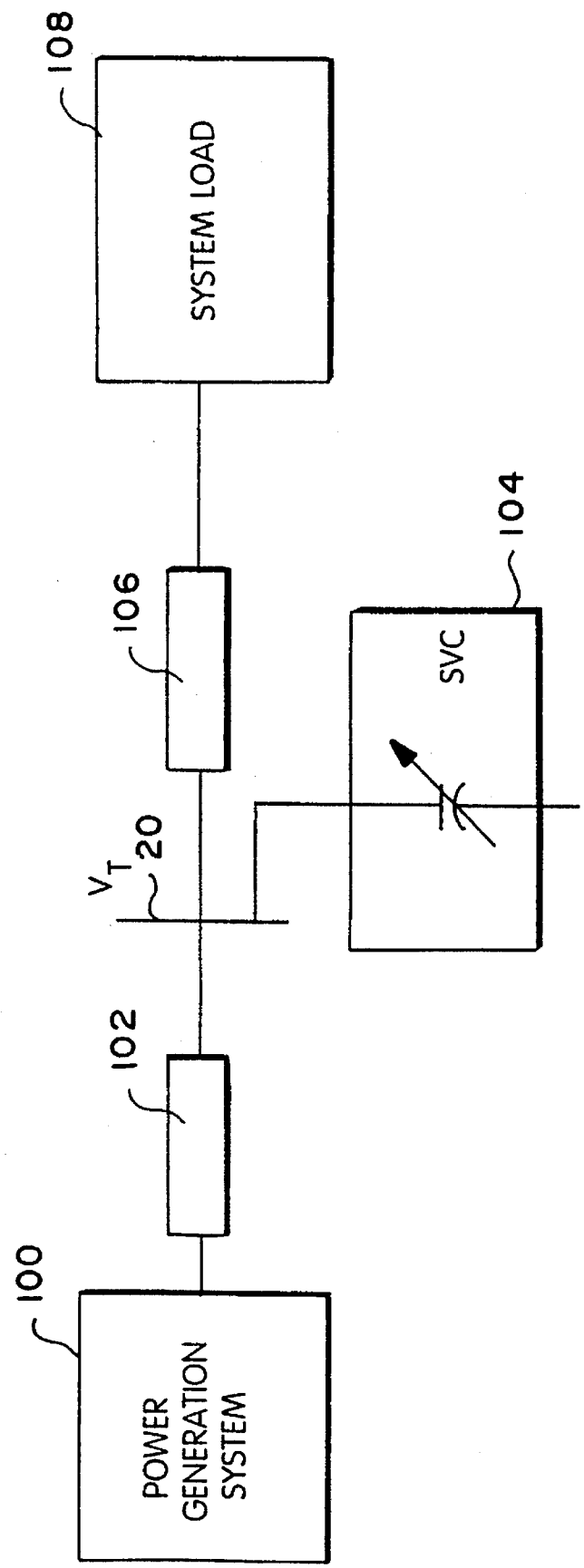
FIG. 4(a) is a high level drawing of a typical SVC application to a power transmission system.
Figure 4B:
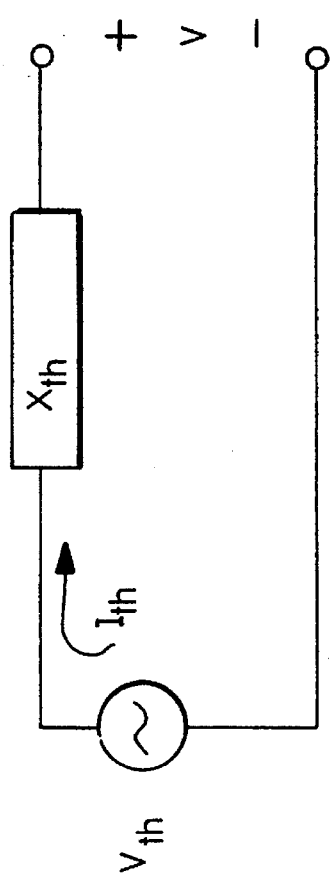
FIG. 4(b) is a schematic of the well known Thevenin equivalent circuit.

A typical SVC application to a transmission system is shown as a single line diagram in FIG. 4(a). Power generation system 100 delivers power over transmission lines 102 and 106 to a system load 108. SVC 104, represented for example as a variable capacitor, is connected in shunt to the power transmission lines between lines 102 and 106 via SVC bus 20. Using well known network theory principles, FIG. 4(a) can be drawn using a Thevenin equivalent circuit. A Thevenin equivalent circuit shown in FIG. 4(b) illustrates that a voltage V at any point or terminal in a network can be easily determined if the Thevenin equivalent voltage Vth and reactance Xth of the network at that point or terminal are known. The voltage V (sometimes referred to as the open circuit voltage Voc) can be determined by summing the voltages around the loop to generate the following equation:

$$V = -Xth*Ith + Vth$$

Figure 4C:
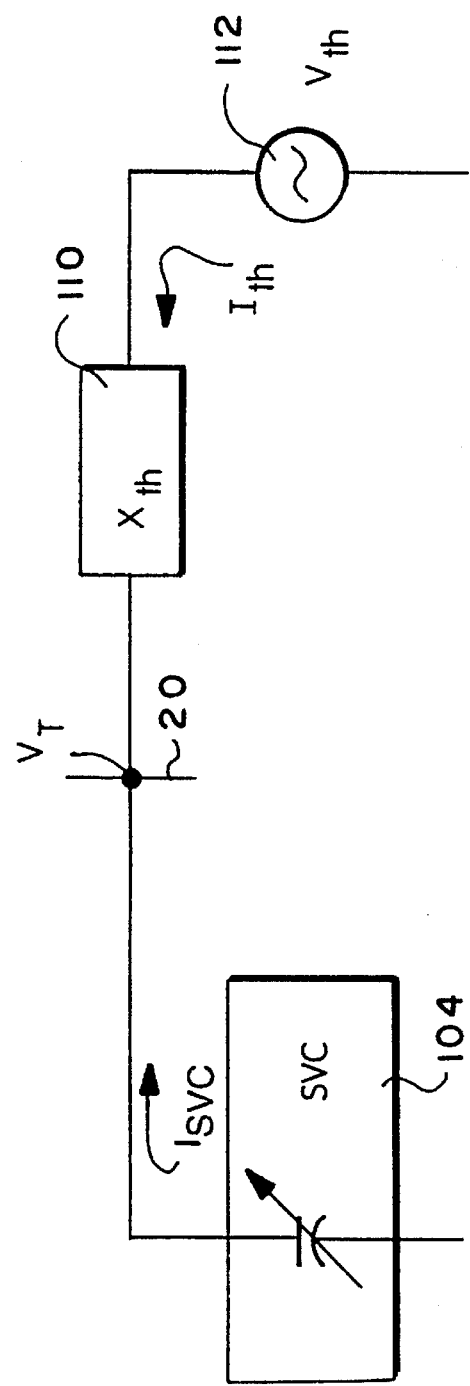
FIG. 4(c) is a schematic representing the power supply system in FIG. 4(a) by its Thevenin equivalent.

For reactive power network analysis, it is assumed that the real part of current can be essentially ignored so that only reactive (imaginary) current need be considered. This assumption simplifies the circuit analysis. As shown in FIG. 4(c), the present invention uses the Thevenin equivalency principle to represent the entire power supply network as seen at bus terminal point $V_T$ by its Thevenin equivalent circuit. Looking from the perspective of SVC 104, the power supply network is replaced by its equivalent Thevenin voltage Vthm source 112 and Thevenin Xth reactance 110.

The SVC bus voltage $V_T$ can be substituted for voltage V in FIG. 4(b) and therefore may be determined using Kirchhoff's voltage law to generate the following:

$$V_T = -Xth*Ith + Vthm \text{ where} \tag{1}$$

$$Ith = -ISVC \tag{2}$$

Substituting ISVC for Ith in equation (1), the following equation is obtained:

$$V_T = Xth*ISVC + Vthm \tag{3}$$

Rearranging the equation to solve for Vthm produces the following:

$$Vthm = V_T - Xth*ISVC \tag{4}$$

From FIG. 4(c), it is clear that $$ISVC = V_T*BSVC \tag{5}$$

Substituting for ISVC in equation (4) produces the following:

$$Vthm = V_T - Xth*V_T*BSVC \tag{6}$$

which reduces to $$Vthm = V_T(1 - Xth*BSVC). \tag{7}$$

An important feature of a Thevenin equivalent is that any dependent source in a circuit must have its controlling element in the same circuit. Thus, by definition, the equivalent power supply network voltage Vthm is independent of the current Isvc injected by the SVC 104. Using this Thevenin model, typical power system disturbances to which the SVC must respond can be represented as changes to the Thevenin equivalent voltage Vthm. For example, increased power transfer from the generator 100 to the load 108 in FIG. 4(a) tends to decrease Vthm.

A practical consequence of the power supply system being a physical system is that inertia is a factor in its response to change. In other words, the system cannot immediately move to a new energy state and stop at precisely that new state. As a result, a change in reactive power demand (corresponding to a change in Vthm) typically produces a response in the form of steps, slow ramps, and swings at the natural oscillation frequency of the power system, e.g. from 0.3 Hz to 2 Hz, until the system reaches its steady state value. Using the Thevenin equivalent model, the SVC voltage can be regulated quickly and accurately while minimizing these oscillations associated with each change in energy. Specifically, once a value for Xth is determined, i.e. estimated as Xthm, Vthm can be determined from measured SVC voltage Vm and measured SVC susceptance Bm by substituting the three phase average SVC voltage Vm for $V_T$ and Bm for BSVC in equation (7) as follows:

$$Vthm = Vm*(1 - Xth*Bm) \tag{8}$$

Figure 5:
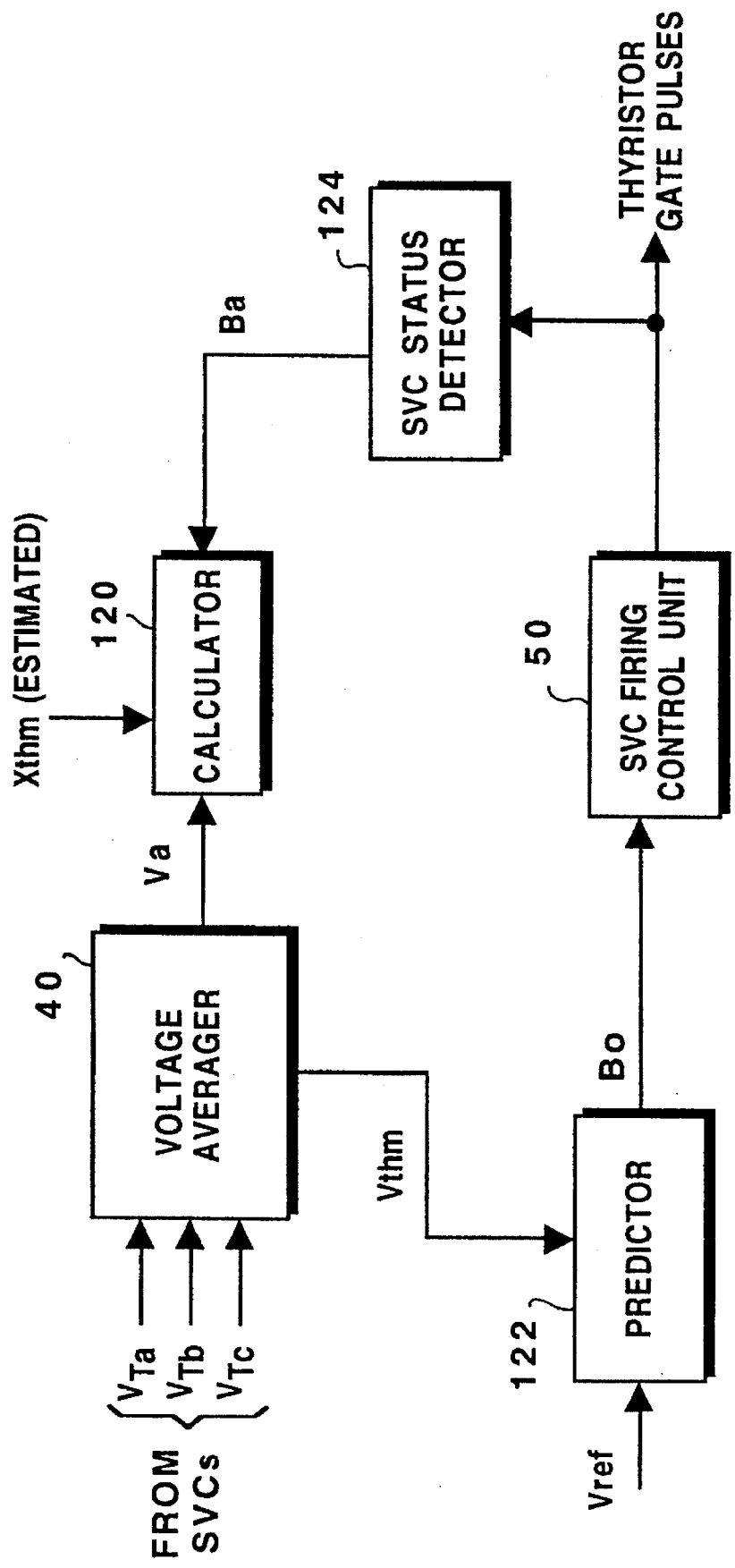
FIG. 5 is a block diagram of an SVC voltage regulator according to one embodiment of the present invention.

One embodiment of an SVC voltage regulator utilizing these principles is described now in conjunction with FIG. 5. Calculator 120 receives the averaged actual SVC voltage Va from conventional voltage averager 40 described earlier and the actual susceptance Ba from a conventional SVC status detector 124. Although Xth cannot be directly measured, it can be estimated based on various parameters of the system with reasonable accuracy. For example, it is common practice in the power industry to determine the short circuit duty for every bus in the power supply network. This short circuit duty can be calculated for a range of system conditions, such as for different numbers of lines in and lines out, to calculate a minimum and a maximum short circuit duty range. From this range of short circuit currents (at a fixed voltage), Xthm can be estimated to be within this range. For example, Xthm may be selected to correspond to the median short circuit current. In accordance with equation (8), calculator 120 determines the Thevenin equivalent voltage Vthm of the power supply network and supplies Vthm to predictor 122.

The purpose of the SVC voltage regulator shown in FIG. 5 is to regulate the actual SVC voltage Vm so that it coincides (as closely as possible) with the reference voltage Vref set by an operator. To achieve this ideal situation, Vm should equal Vref. Substituting Vref for Vm in equation (8) above, we arrive at the following:

$$Vthm = Vref(1 - Xthm*Ba) \quad (9)$$

Since Vthm, Vref and Xth are now known, a desired or ordered susceptance Bo can be predicted from this equation that would meet the desired condition of Vm=Vref. Rearranging equation (9) and replacing Bo for Ba produces:

$$Vthm/Vref = 1 - Xthm*Bo \quad (10)$$

$$1 - Vthm/Vref = Xthm*Bo \quad (11)$$

$$Bo = [1 - (Vthm/Vref)]/Xthm \quad (12)$$

Predictor 122 calculates the predicted ordered susceptance Bo in accordance with equation (12), and Bo is then processed by SVC firing control unit 50 along with the conventional hysteresis factor $B_{HYST}$ described above in conjunction with FIG. 2. SVC firing control unit 50 generates thyristor gate pulses for activating the thyristors 36 of the SVC 10 shown in FIG. 1 so that current flows through corresponding capacitors 32 for a period of time necessary to provide the desired reactive power which is proportional to the ordered susceptance Bo. The SVC status detector 124 detects the status of the thyristor gate pulses for each TSC in the SVC 10 to determine the susceptance Ba delivered to the bus. Ba is determined by SVC detector 124 in accordance with the following equation:

$$Ba = [(BTSC1*\text{gate signal}) + (BTSC2*\text{gate signal}) + \ldots (BTSC5*\text{gate signal})] \quad (13)$$

where BTSC is determined based on the value of capacitor 32, and the gate signal is either a "1" (on) or a "0" (off). Susceptance Ba is then delivered to calculator 120.

The calculator 120, predictor 122, firing control unit 50, and SVC status detector 124 may be implemented using either analog components or digital hardware. Digital hardware implementations may include discrete logic circuits, custom designed LSI chip(s), and/or digital signal processor chip(s). A suitably programmed microprocessor or microcomputer may also be employed. Because of the flexibility provided by program control, the latter implementation is preferred.

Figure 6:
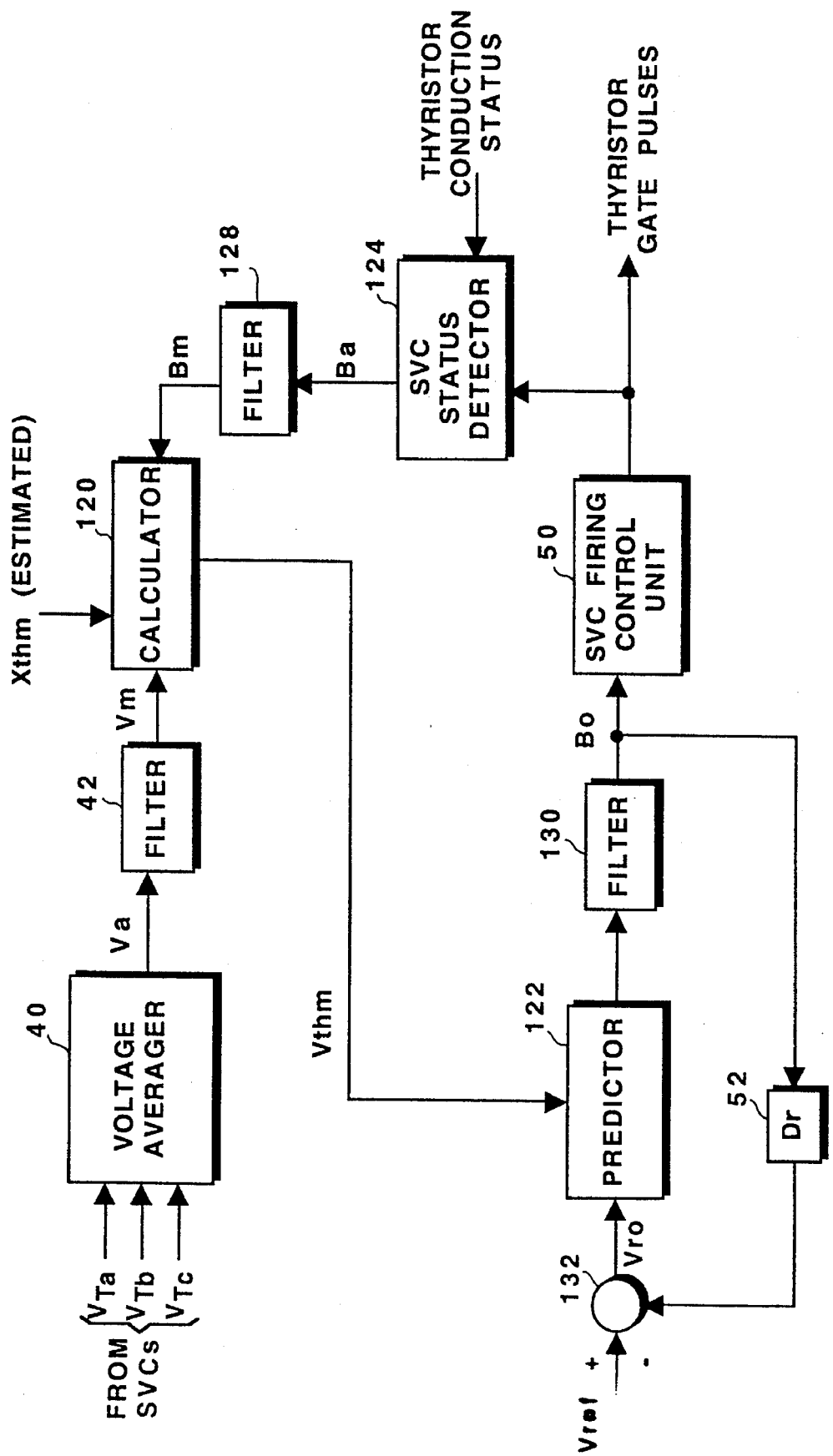
FIG. 6 is a block diagram of an SVC voltage regulator according to another embodiment of the present invention.

FIG. 6 illustrates another embodiment of the present invention that includes refinements to the system of FIG. 6 which improve the practical operation of the SVC voltage regulator. A conventional smoothing filter 42 such as that described along with FIG. 2 may be added to smooth out ripple content of average voltage Va to generate measured voltage Vm; however, filter 42 introduces delays into the signal processing. This delay is accounted for by adding filter 128 which imposes a similar time delay on the actual measured susceptance signal Ba before Bm is received at calculator 120. In this way, the measured voltage Vm and measured susceptance Bm are synchronously input to the calculator 120. Another practical refinement is the use of slope setting unit 52 also described earlier in conjunction with FIG. 2 which receives and takes the ordered susceptance Bo to determine the change in Vref. That droop signal (Dr*Bo) is applied to summer 132 which then calculates the difference between the droop signal and Vref to generate an effective order Vro to be processed by predictor 122.

In contrast to the traditional closed loop feedback type of control, the present invention uses feedforward predictive control. As a result, conventional integration, i.e. K/s 48, and deadband circuitry 46 are not needed. Moreover, the SVC voltage regulator according to the present invention achieves superior performance in terms of accuracy, sensitivity, speed, and stability as compared with the best conventional SVC voltage regulators described in the background of the invention. A comparison of the performance results between the two is provided in FIGS. 7(a)–7(f).

Figures 3E, 3F:
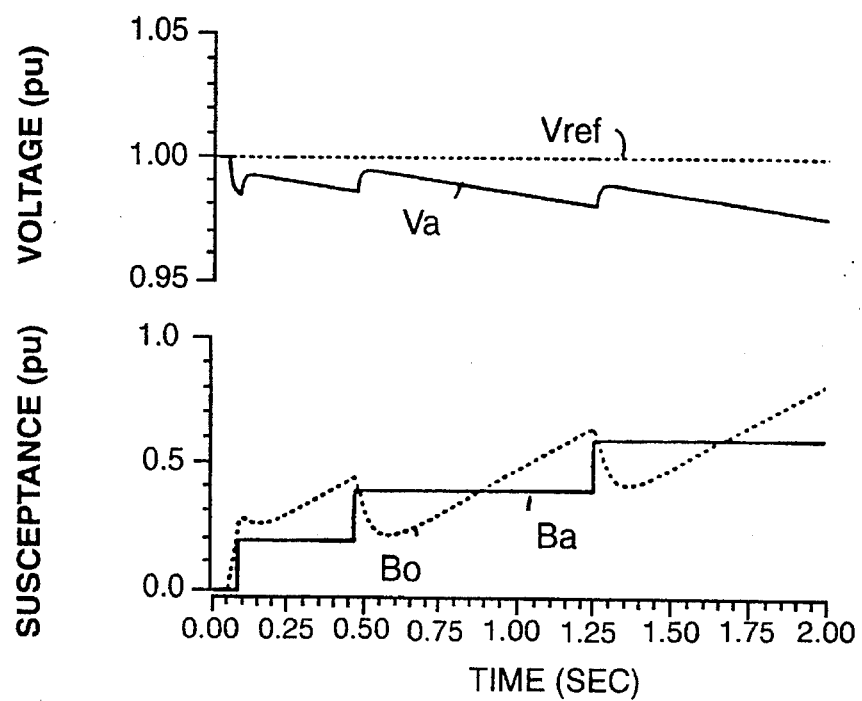
Figure 7A:
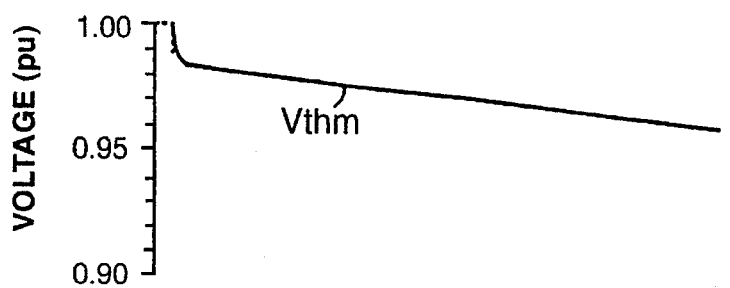
FIGS. 7(a)–7(f) are graphs comparing the performance of conventional SVC voltage regulators with a SVC voltage regulator according to the present invention.
Figure 7B:
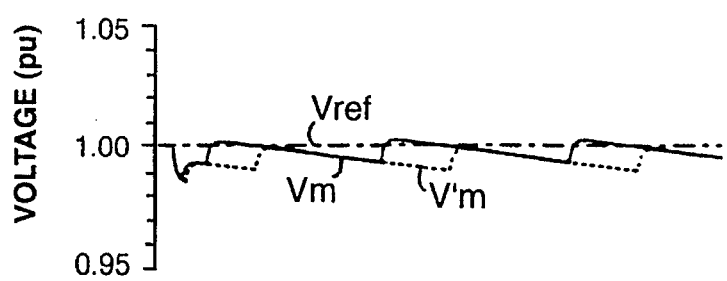
Figure 7C:
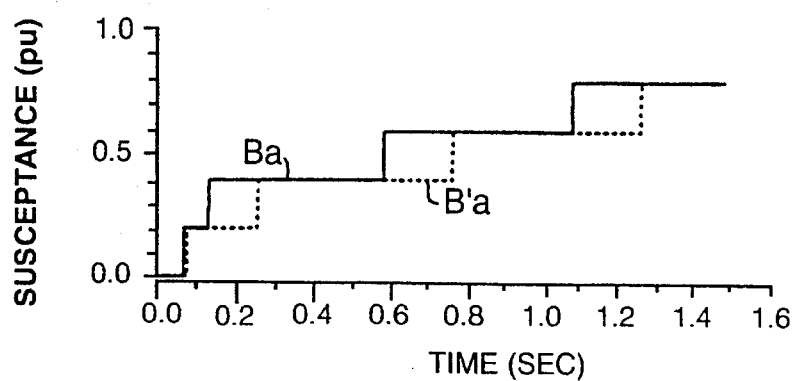

FIGS. 7(a)–7(c) illustrate the performance of the SVC voltage regulator according to the present invention compared to a conventional regulator with deadband control as illustrated earlier in FIG. 3(c). In FIG. 7(a) (and FIG. 7(d)), a disturbance or other change in the system voltage at time 0.1 seconds corresponds to the sharp drop in Vthm as calculated by calculator 120. In response to the decrease in system voltage Vthm, the reactive power delivered to the system is increased as represented by the increasing susceptance as illustrated in FIG. 7(c) (and FIG. 7(f)) where the actual susceptance Ba produced in accordance with the present invention is plotted as the solid trace and the actual susceptance Ba produced by the conventional deadband approach is plotted as the dashed trace.

Figure 7D:
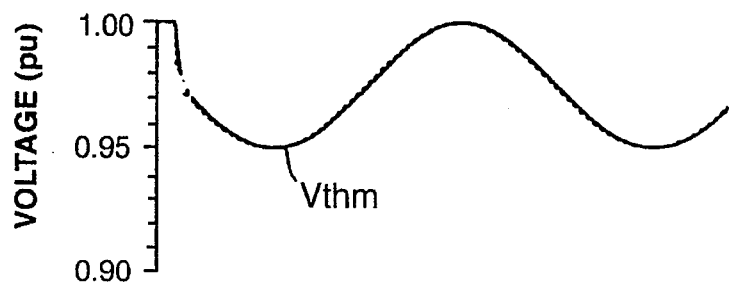
Figure 7E:
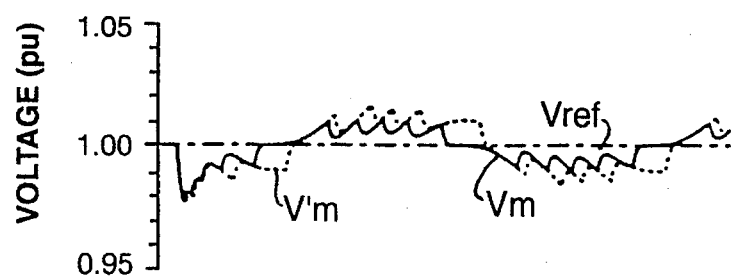
Figure 7F:
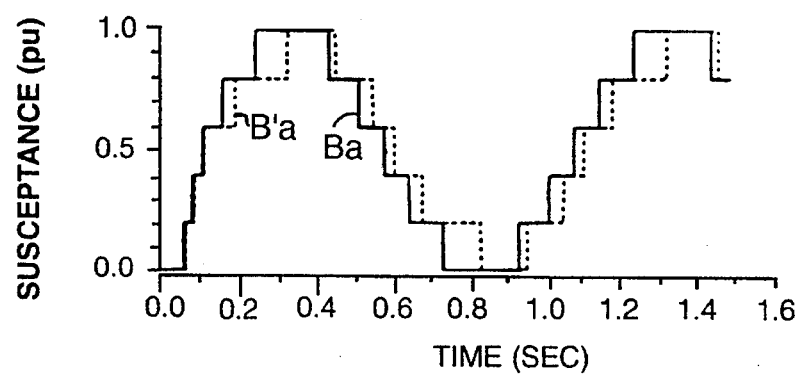

FIG. 7(b) plots the measured SVC voltage $V_m$ as a solid trace against the desired reference voltage Vref of 1.00 pu and shows how closely Vm tracks Vref as a result of the present invention. The dotted trace Vm indicates the conventional deadband response shown in FIG. 3(c). It is easy to see that the solid trace more closely and consistently tracks the Vref value of 1.00 pu. FIGS. 7(d)–7(f) make a similar performance comparison of the SVC voltage regulator of the present invention to that of a conventional deadband SVC voltage regulator taking into account a 1 Hz power swing which is typical of the oscillation frequency of the system response to changes in power represented as steep changes in Vthm.

From the comparison in FIGS. 7(a)–7(f), it is clear that the SVC voltage regulator of the present invention tracks the SVC voltage Vm (the solid trace) more closely to the reference or desired voltage Vref than the conventional regulators represented by V'm (the dotted trace). Moreover, it is readily seen that the solid traces for both Vm and Ba corresponding to control by the present invention respond with much less delay or phase lag when compared with the conventional regulators' delayed response of V'm and B'a (dotted traces). Accordingly, the predictive SVC voltage regulator of the present invention provides greater sensitivity/accuracy in its response to system power changes at a faster speed than conventional closed loop regulators while still maintaining necessary stability. This improved performance is accomplished because Vthm is substantially insensitive to and independent of the reactive current ISVC delivered by SVC 10 to the power supply network.

Figure 8A:
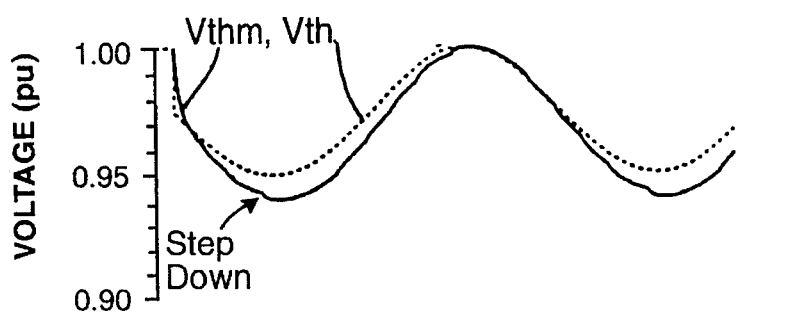
FIGS. 8(a)–8(f) are graphs comparing the performance of the present invention as a function of the accuracy of the estimate of Xthm.
Figure 8B:
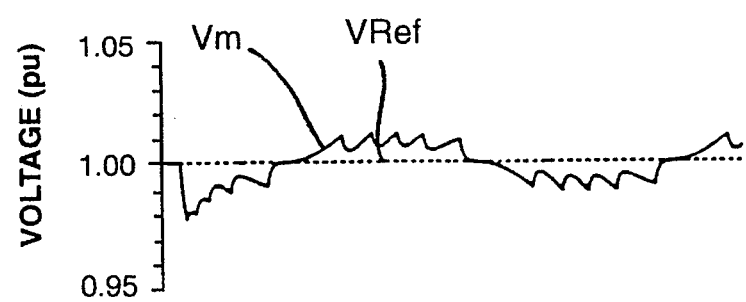

As can be seen from equations 9 and 12 above, the calculation of Thevenin voltage Vthm and the ordered susceptance Bo is dependent upon the accuracy of the estimate of Thevenin equivalent reactance Xthm. Ultimately, the sensitivity of the voltage regulator will have to be compromised to the extent that the estimate of Xthm differs from the actual value. For example, FIGS. 8(a)–8(c) graphically illustrate a situation where the estimate of Xthm is 20% greater than the actual value of Xthm, and FIGS. 8(d)–8(f) illustrate a situation where the estimate Xthm is 20% below the actual value. The responses in FIGS. 8(b)

and 8(c) as well as 8(e) and 8(f) are substantially the same as those shown in FIGS. 7(e) and 7(f). The significant difference is that the actual value of the Thevenin equivalent voltage Vth is different from the calculated Thevenin voltage Vthm. In FIG. 8(a), when the Xthm estimate is too large, Vthm (shown as the solid line) is more active than the actual system response represented by Vth (the dotted trace). In FIG. 8(d), when the Xthm estimate is too small, Vthm is less active than the actual system response indicated by Vth. In addition, changes in actual susceptance Ba (see FIGS. 8(c) and 8(f)), which are representative of SVC switching points, cause Vthm to step down to a lower value even further away from Vth as shown for example at the "step down" point in FIG. 8(a). When the Xthm estimate is 20% less than the actual value, changes in Ba cause Vthm to step up to an even higher value further away from Vth as shown at the exemplary "step up" point in FIG. 8(d). Thus, large differences between the estimated and actual equivalent reactance adversely impact the accurate performance of the voltage regulator.

In stable power system conditions, a fixed estimate of the Thevenin reactance Xthm works reasonably well in achieving the desired voltage regulation. However, in severe power system line-outage contingencies over the power transmission network, a fixed estimate value of Thevenin reactance compromises the sensitivity and accuracy of the SVC voltage regulator as described above in conjunction with FIGS. 8(a)–8(f). In addition, these severe contingencies can cause considerable sustained local oscillations or "chattering", the effects of which are described in conjunction with the graphs illustrated in FIGS. 9(a)–9(f).

Figure 9A:
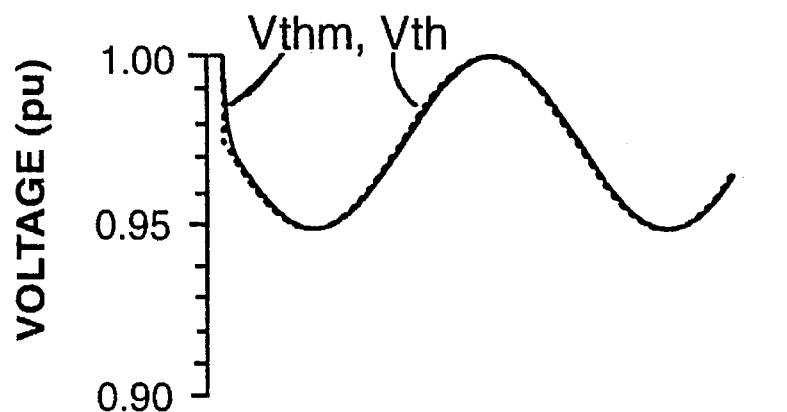
FIGS. 9(a)–9(f) are graphs comparing the system response performance when Xth is substantially the same as the actual system reactance and when severe power system contingencies generate a large difference between Xth and the actual system reactance.
Figure 9B:
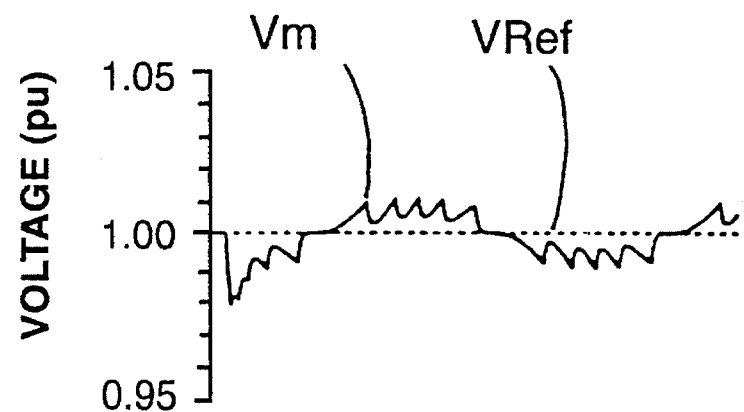
Figure 9C:
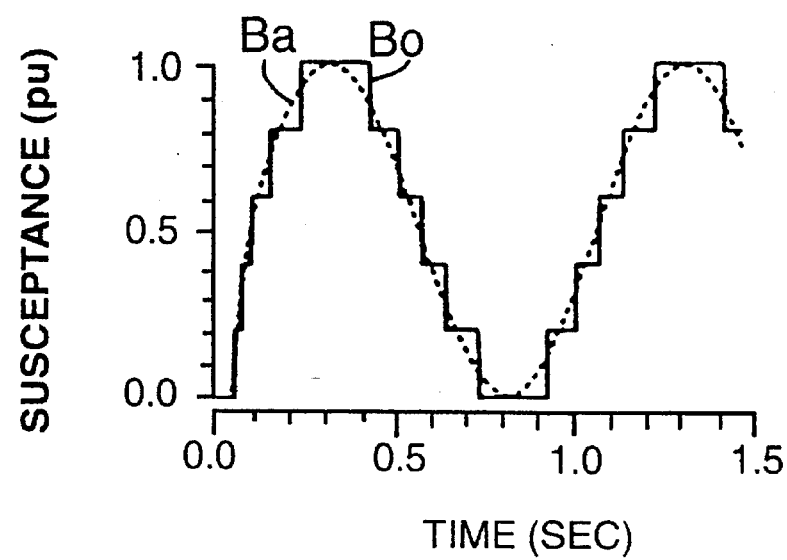
Figures 9D, 9E, 9F:
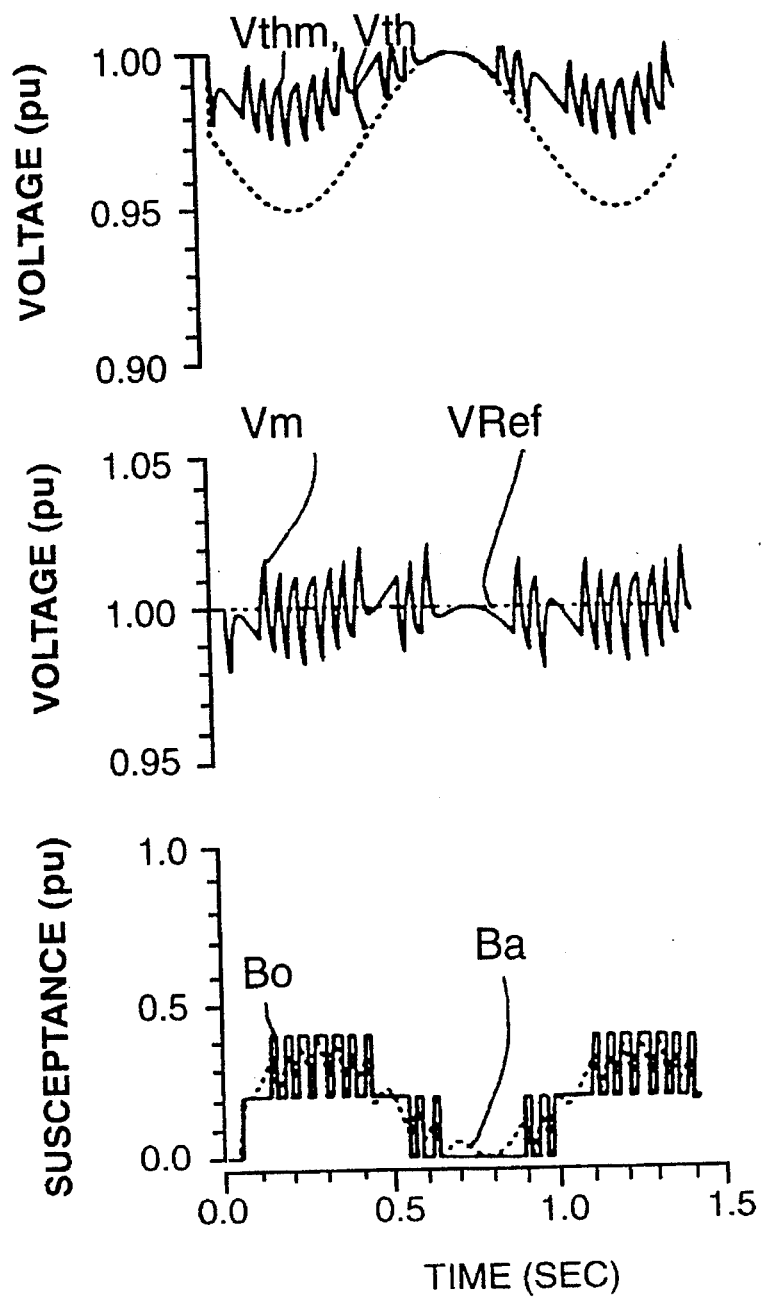

FIGS. 9(a)–9(c) show the system response at a fixed estimate of Xthm where the actual system impedance remains substantially constant, i.e. there are no large increases in the actual system equivalent impedance due to severe line outage contingencies. In this instance, the calculated Thevenin equivalent voltage Vthm (solid trace) tracks very closely the actual Thevenin equivalent voltage Vth (the dotted trace), and a fixed estimate Xthm works very well for the SVC voltage regulator. FIGS. 9(d)–9(f), however, illustrate situations where, because of severe line outage contingencies in the power transmission network, a very large change (on the order of 300%) may occur in actual equivalent system impedance. For these severe conditions, the SVC voltage regulator response, as seen in Vthm in FIG. 9(d), Vm in FIG. 9(e), and Bo in FIG. 9(f), includes significant chattering at a very high oscillation rate.

Figure 8C:
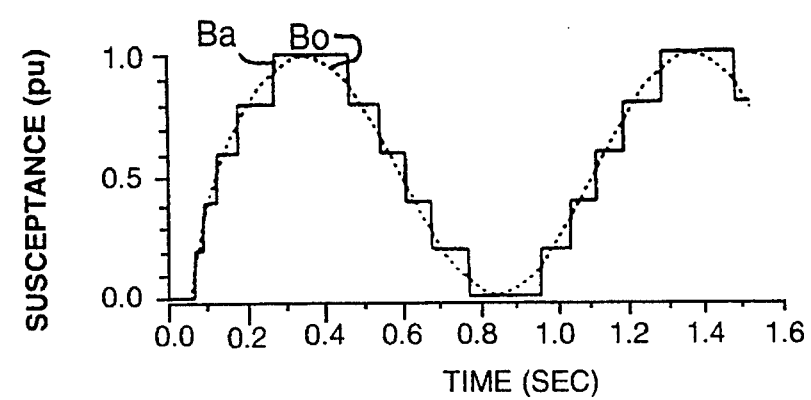
Figures 8D, 8E, 8F:
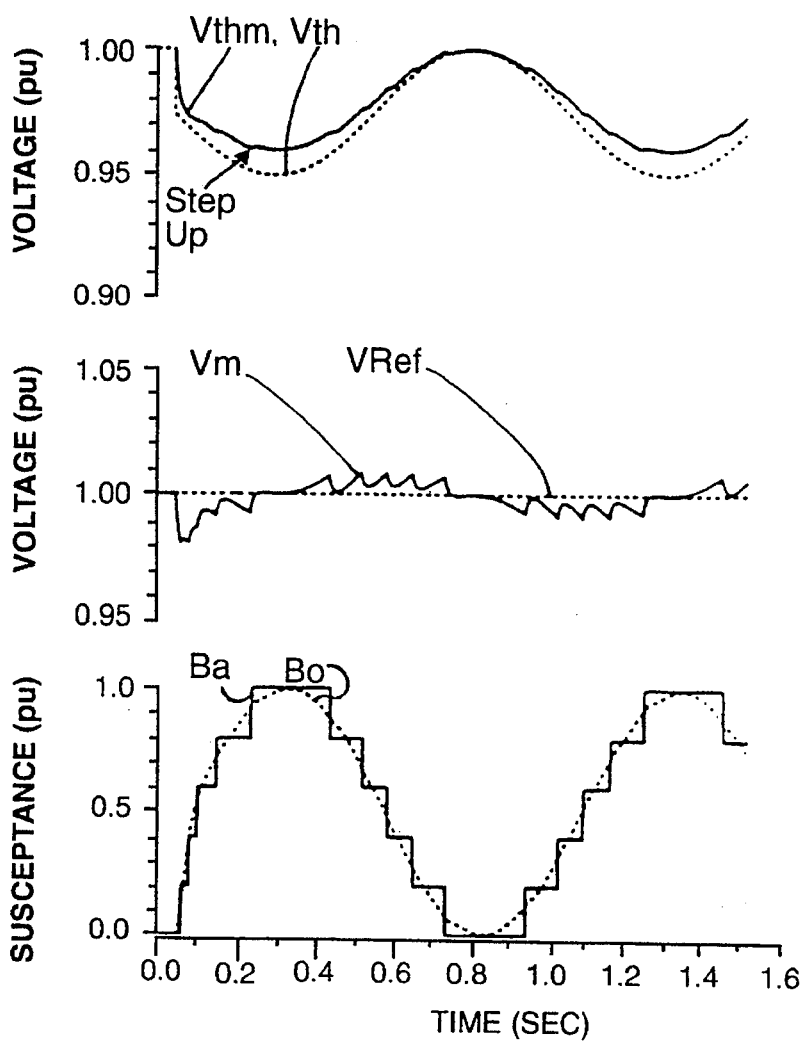

In the following embodiment, a Thevenin-tracking mechanism automatically modifies the estimated Thevenin reactance Xthm to respond to severe power condition changes in order to quickly eliminate the undesirable chattering shown in FIGS. 9(d)–9(f) and to minimize the inaccuracy of the calculated value of Vthm as shown in FIGS. 8(a) and 8(c). Referring to the function block diagram in FIG. 10 (where like reference numerals refer to like elements earlier described), SVC bus voltages from each phase VTa, VTb, VTc are averaged in voltage averager 40 and filtered in ripple filter 42 to generate a measured SVC voltage Vm for input to calculator 120. SVC status detector 124 detects the thyristor conduction status signals and generates the actual susceptance Ba provided by the SVC 10 which is then filtered in filter 128 to provide the measured susceptance Bm to calculator 120. Based on equation (9) set forth above, calculator 120 calculates the measured Thevenin equivalent voltage Vthm and forwards Vthm to predictor 122 which then calculates and produces (via filter 130) an ordered susceptance Bo based on equation (12) noted above using reference-related voltage Vro and Vthm. SVC firing control unit 50 then generates the necessary thyristor gate pulses to activate the TSCs of the SVC 10 to deliver the appropriate reactive current in response to the commanded susceptance Bo.

The Xthm tracking mechanism is based on changes in the calculated value of Thevenin voltage Vthm and the measured SVC susceptance Bm. The Thevenin reactance Xthm is adjusted to reduce the changes in Vthm to zero due to changes in Bm. To effect this adjustment, Vthm and Bm are input to corresponding conventional bandpass filters 200 and 202. Preferably, filters 200 and 202 are matched bandpass filters. Bandpass filters 200 and 202 are tuned to a frequency band that permits focus on the local oscillations or "chatter" described above and generate filter signals $\Delta$Vthm and $\Delta$Bm. In power systems, there is substantial external system energy below 2 Hz and above 30 Hz which has nothing to do with the objectionable chatter. As a result, the bandpass filters 200, 202 are adjusted to pass energy primarily in the bandpass from 5 to 20 Hz. If there is no chatter detected in this frequency range, the bandpass filters produce a substantially zero output signal which causes no adjustment in the equivalent reactance estimate Xthm. However, if there are nonzero filter outputs, then Xthm is automatically adjusted until the filter outputs are reduced to zero.

The filter outputs $\Delta$Vthm and $\Delta$Bm of bandpass filters 200 and 202 are multiplied or "correlated" in multiplier 204 to generate a correlation output. In some instances, it may be desirable to further emphasize the $\Delta$Bm signal energy to better distinguish between $\Delta$Vthm caused by $\Delta$Bm as opposed to external influences. One way of providing this emphasis is by taking the absolute value of filter output $\Delta$Bm of bandpass filter 202 in absolute value unit 206 and raising that magnitude to an exponent n, where n may be any real number. The output of the exponent unit 208 is then multiplied in multiplier 210 by the correlation output produced by multiplier 204. If the exponent n is set to zero, no emphasis is applied to the $\Delta$Bm signal energy passed between 5 and 20 Hz. However, as the value of n increases, the output from exponent unit 208 effectively emphasizes the output from bandpass filter 202. The more the filter output $\Delta$Bm is emphasized, the more secure the tracking of the equivalent reactance Xthm. Selection of the value of exponent n is performed by the system designer through field testing or simulations of a specific application and may be, for example, in the range $0 < n \leq 1$. Those skilled in the art will of course appreciate that there are other techniques that may be used to emphasize $\Delta$Bm.

The correlation product generated by multiplier 210 is amplified in variable gain amplifier 212 and limited to a maximum value. The amplifier output is then integrated in integrator 214 which is also limited to maximum and minimum values for Xthm. The limits for amplifier 212 and integrator 214 correspond to the maximum rate of change and dynamic range of Xthm, respectively, and are needed to prevent excessive oscillation such as might be caused by noise present in input signals. The absolute value unit 206 and exponent unit 208 effectively function as a filter weights applied to the correlation of $\Delta$Bm and $\Delta$Vthm. The amplified, weighted correlation provides a rate of change signal for automatically modifying the reactance estimate Xthm to reduce the observed changes in Vthm.

Figure 10:
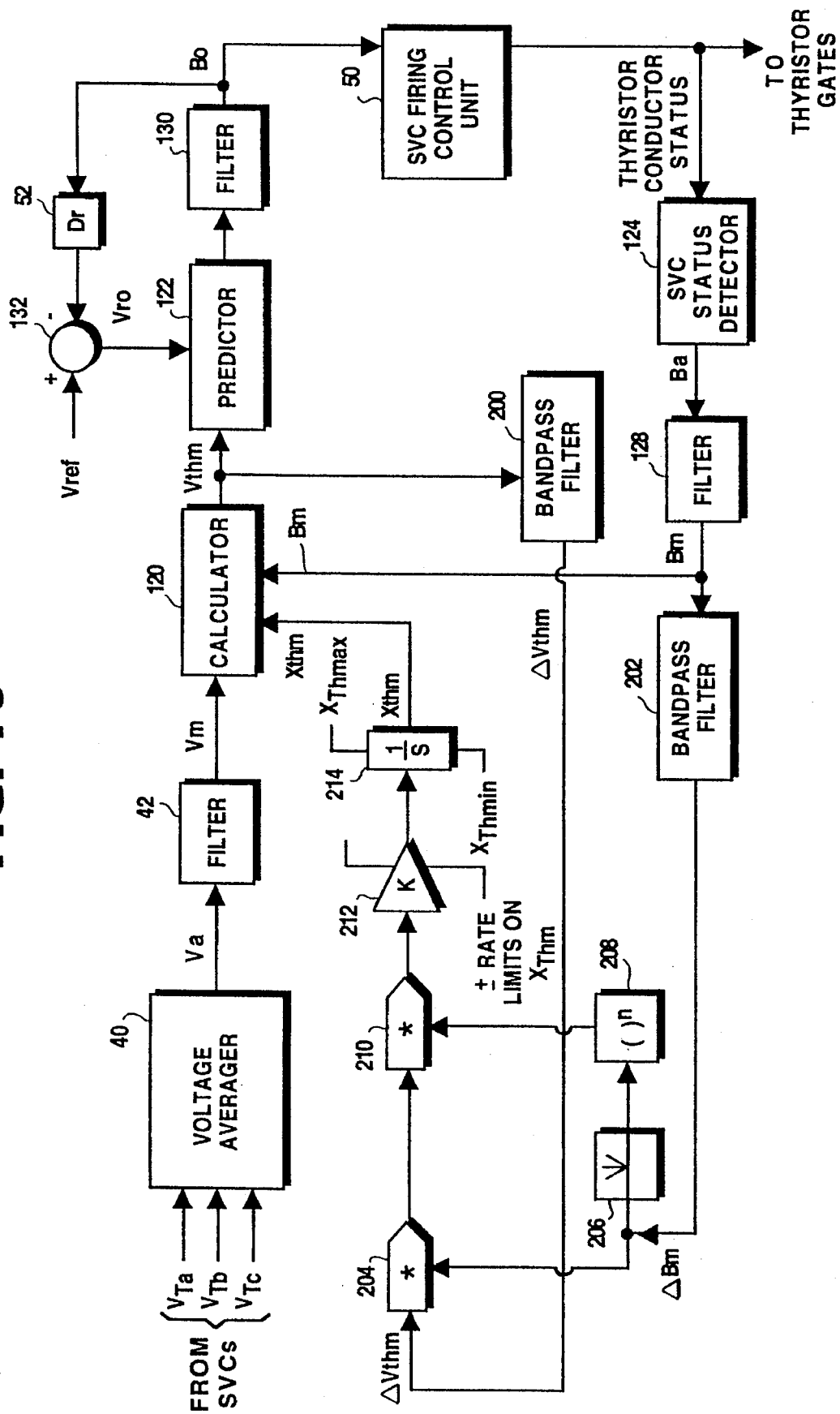
FIG. 10 is a function block diagram of an SVC voltage regulator according to another embodiment of the present invention that automatically modifies Xth to track and account for large disturbances in the power transmission network.

FIGS. 11(a)–11(d) graphically illustrate the performance of the power supply system using the embodiment of the present invention as illustrated in FIG. 10 when the power supply system undergoes a severe line outage contingency.

Figure 12A:
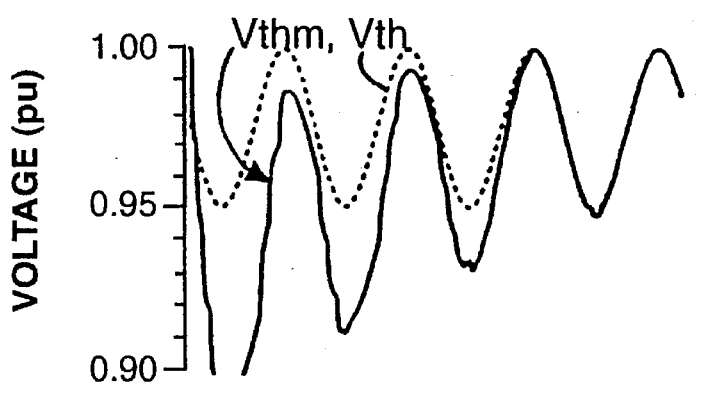
FIGS. 12(a)–12(d) are graphs illustrating the system performance when the disturbance to the power system is removed with the estimate of Xthm automatically moving back to a constant level.
Figure 12B:
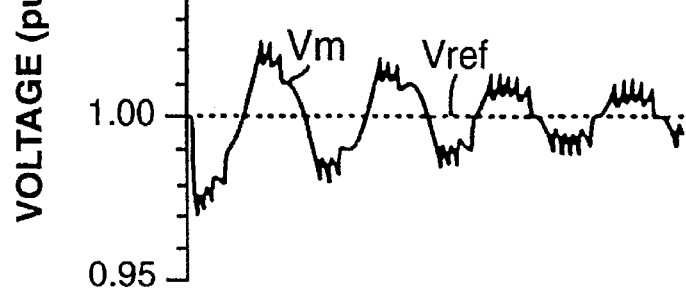
Figure 12C:
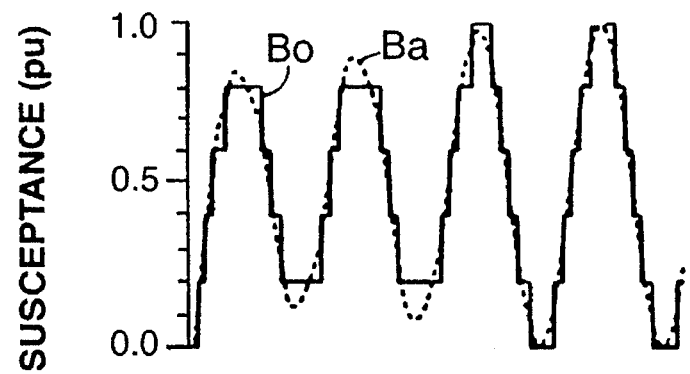
Figure 12D:
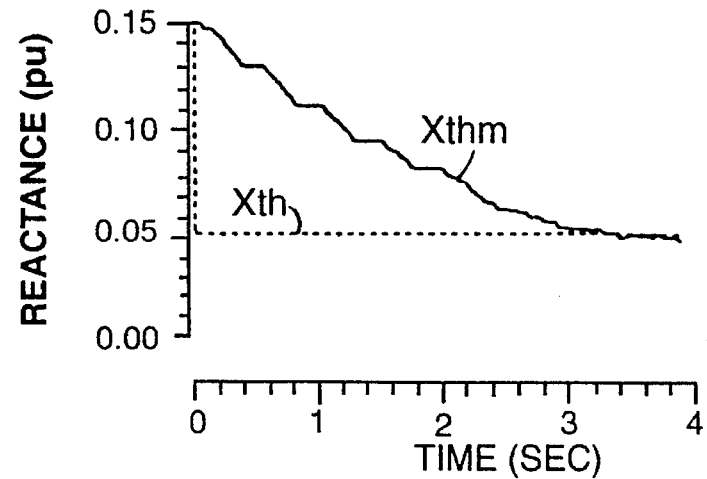

In FIG. 11(d), the actual equivalent reactance Xth as a dotted line is plotted along with the estimated equivalent reactance Xthm as the solid line. An exemplary significant line outage contingency occurs just after 0.0 seconds. A significant disparity is generated immediately between the two equivalent reactance values Xth and Xthm. However, after three seconds, the present invention automatically adjusts Xthm so that it substantially equals the actual equivalent reactance Xth. Initially, as shown in FIGS. 11(a)–11(c), there are substantial local oscillations (chatter) in the Vthm, Vm, and Bm waveforms. Between two and three seconds, however, those local oscillations are substantially eliminated, and the actual and calculated equivalent voltage values Vth and Vthm, respectively, in FIG. 11(a) are substantially the same. FIGS. 12(a)–12(d) show a situation where the power transmission system having been in a severe power outage contingency switches back to normal operating conditions. As shown in FIG. 12(d), at 0.0 seconds the estimate of equivalent reactance Xthm is much different than its steady state value. The actual equivalent reactance Xth drops from its severe condition level of 0.15 pu to a more typical steady state value of 0.05 pu. After less than three seconds, the estimated value of equivalent reactance Xthm substantially is the same as the actual value Xth. In addition, after approximately three seconds, the calculated equivalent voltage Vthm has been brought into line with the actual equivalent voltage Vth.

Thus, the automatic adjustment of the estimate of Xth provides for a flexible and reliable SVC voltage regulator. Even if the power supply network is subjected to severe power changes, that SVC voltage regulator adapts to and compensates for those changes in order to deliver the necessary reactive power.

Having illustrated and described the principals of the invention with respect to the preferred embodiments, it should be apparent to those skilled in the art that the invention may be modified in arrangement and detail without departing from those principals. For example, while the SVCs have been described in terms of susceptance B, those skilled in the art will recognize that reactance X could also be used. It will be understood by those skilled in the art that the invention is not limited to the disclosed embodiments and is intended to cover various modifications in equivalents included within the scope of the following claims.

What is claimed is:

1. A voltage regulator for regulating voltage of a static VAR compensator (SVC) connected to a power supply network, comprising:

a calculator for calculating a voltage representative of the power supply network based on measured SVC susceptance, measured SVC voltage, and an estimate of the power supply network's equivalent reactance; and a predictor for predicting a susceptance to be provided by the SVC based on the representative voltage, wherein the voltage regulator regulates the SVC voltage using the predicted susceptance value.

2. The voltage regulator according to claim 1, further comprising:

means for automatically modifying the estimated equivalent reactance in response to changes in the power supply network.

3. A voltage regulator as claimed in claim 2, wherein the means for automatic modifying includes:

means for correlating the representative voltage and the measured SVC susceptance in a predetermined frequency band, and means for modifying the estimated equivalent reactance based on the correlation.

4. A voltage regulator as claimed in claim 3, wherein the means for correlating includes first and second bandpass filters for passing signals in the frequency range of 5–20 Hz.

5. A voltage regulator as claimed in claim 3, further comprising:

means for emphasizing the outputs from the first and second bandpass filters to increase the responsiveness of the means for automatically modifying the estimated equivalent reactance.

6. A voltage regulator as claimed in claim 4, wherein the means for emphasizing includes:

a multiplier;

means for determining the absolute value of an output of the second bandpass filter; and means for raising an output of the means for determining by an exponent n, where n is a real number greater than zero.

7. A voltage regulator as claimed in claim 3, further comprising:

means for weighting output signals from the first and second bandpass filters to increase the responsiveness of the means for automatically modifying the estimated equivalent reactance.

8. The voltage regulator according to claim 3, wherein the means for automatically modifying the estimated reactance further includes:

a correlator for correlating respective outputs of the first and second bandpass filters;

an amplifier for amplifying an output of the combiner; and an integrator for integrating an output of the amplifier to generate the estimated equivalent reactance.

9. The voltage regulator according to claim 1, wherein the representative voltage is the Thevenin equivalent of the power supply network and the equivalent reactance is the Thevenin equivalent reactance of the power supply network.

10. The voltage regulator according to claim 1, further comprising:

means for measuring SVC voltage;

a control unit for calculating gate signals for controlling thyristors in the SVC based on the predicted susceptance value; and detecting means for detecting conduction status of the SVC thyristors and generating the measured SVC susceptance in accordance with the conduction status.

11. The voltage regulator according to claim 1, wherein the calculator calculates the representative voltage based on the following equation:

$$Vthm = Vm(1 - Xthm*Bm)$$

where Vthm is the calculated voltage, Vm is the measured SVC voltage, Xthm is the estimated equivalent reactance, and Bm is the measured SVC susceptance.

12. The voltage regulator according to claim 11, wherein the predictor predicts the predicted SVC susceptance Bo in accordance with the following equation:

$$Bo = (1 - Vth/Vm)/Xthm.$$

13. A voltage regulator comprising:

a static VAR compensator (SVC) switchably connected to a power supply network at a bus;

means for measuring a susceptance delivered by the SVC to the power supply network;

means for measuring an SVC voltage at the bus;

means for modelling the power supply network at the bus using an equivalent network including an equivalent voltage and an equivalent reactance, the equivalent voltage being determined based on an estimate of the equivalent reactance, the measured SVC susceptance, and the measured SVC bus voltage;

means for predicting a desired SVC susceptance based on the equivalent voltage and a reference SVC bus voltage; and means for controlling switching of the SVC based on the predicted SVC susceptance.

14. The voltage regulator according to claim 13, further comprising:

means for tracking changes in the equivalent voltage and measured SVC susceptance and automatically modifying the estimate of equivalent reactance in response to those changes.

15. The voltage regulator according to claim 13, wherein the equivalent network is the Thevenin equivalent circuit of the power supply network.

16. The voltage regulator according to claim 13, wherein the power supply network includes plural phases of power with each phase including an SVC, further comprising:

means for measuring SVC voltages for each phase and averaging the measured SVC phase voltages to provide an average SVC voltage to the calculator Vm, and detecting means for detecting activation status of the SVCs and generating the measured susceptance in accordance with the detected activation status;

wherein the means for controlling includes a firing control unit for receiving the predicted SVC susceptance and calculating control pulses for activating an SVC.

17. The voltage regulator according to claim 16, further comprising:

a first filter having an associated predetermined delay and connected to the means for modelling for filtering the average SVC voltage, and a second filter, connected to the means for modelling and having substantially the same delay as the predetermined delay, for filtering the measured susceptance.

18. The voltage regulator according to claim 13, wherein the means for modelling calculates the equivalent voltage Vthm in accordance with the following equation:

$$Vthm = Vm(1 - Xthm \ast Bm)$$

where Vm is the measured SVC voltage, Xthm is the estimated equivalent reactance, and Bm is the measured susceptance.

19. The voltage regulator according to claim 18, wherein the means for predicting predicts the predicted susceptance Bo in accordance with the following equation:

$$Bo = (1 - Vth/Vm)/Xthm.$$

20. The voltage regulator according to claim 13, further comprising:

a summer for receiving a reference SVC voltage, and a feedback loop for feeding back the ordered susceptance to the summer through a desensitizing circuit, wherein the summer determines the difference between the reference voltage and an output signal from the desensitizing circuit and provides that difference to the means for predicting.

21. The voltage regulator according to claim 13, further comprising:

a filter for filtering an output of the means for predicting and generating the predicted susceptance, and an SVC status detector for detecting an activation status of the SVC to determine the measured susceptance.

22. A method for regulating the bus voltage of a static VAR compensator (SVC) that supplies reactive power to a power supply network, comprising:

determining a power supply network voltage based on reactive power delivered to the network by the SVC, SVC bus voltage, and an estimate of the power supply network's reactance, and regulating the SVC bus voltage based on the determined power supply network voltage.

23. The method according to claim 22, the regulating step further comprising:

calculating a desired susceptance to be delivered by the SVC based on the determined power supply network voltage.

24. The method according to claim 22, further comprising:

automatically modifying the estimated reactance in response to changes in the power supply network.

25. A method according to claim 24, wherein the power supply network voltage is determined based also on measured susceptance and measured voltage of the SVC.

26. A method as claimed in claim 25, wherein the automatic modifying step includes:

correlating the power supply network voltage and the measured SVC susceptance in a predetermined frequency band, and modifying the estimated reactance based on the correlation.

27. The method according to claim 22, the regulating step further comprising:

predicting a desired reactance to be delivered by the SVC based on the determined power supply network voltage.

28. The method according to claim 27, further comprising:

measuring the SVC voltage;

generating SVC control signals based on the predicted reactance;

activating the SVC in accordance with the control signals;

detecting the activation status of the SVC; and generating a measured susceptance in accordance with the detected SVC activation status, wherein the measured susceptance is representative of the reactive power delivered to the power supply network.

29. The method according to claim 27, wherein the power supply network voltage Vthm is based on the following equation:

$$Vthm = Vm(1 - Xthm \ast Bm)$$

where Vm is the SVC bus voltage, Xthm is the estimate of the power supply network reactance, and Bm is a measured susceptance of the SVC representative of the SVC reactive power.

30. The method according to claim 29, wherein reactance is predicted based on the following equation:

$$Bo = (1 - Vth/Vm)/Xthm.$$

31. The method according to claim 22, wherein the determined power supply network voltage is the Thevenin equivalent voltage of the power supply network and the estimate of the power supply network's reactance is the Thevenin equivalent reactance of the power supply network.

32. A power generation system, comprising:

a power generator for supplying power to a load via a transmission line;

a bus connected to the transmission line;

a reactive power compensator connected to the bus for selectively supplying reactive current to the transmission line;

means for maintaining voltage at the bus substantially at a reference voltage including:

a calculator for calculating a voltage representative of the power generation system based on measured SVC susceptance, measured SVC voltage, and an estimate of the power generation system's equivalent reactance, a predictor for predicting a susceptance to be provided by the reactive power compensator based on the calculated voltage, and means for regulating the bus voltage using the predicted susceptance value.

33. The system according to claim 32, wherein the reactive power compensator is a static VAR compensator (SVC).

34. The system according to claim 33, further comprising:

means for tracking changes in the calculated voltage and measured SVC susceptance and automatically modifying the estimate of the equivalent reactance in response to those changes.

35. A system as claimed in claim 34, wherein the means for automatic modifying includes:

means for correlating the equivalent voltage and the measured SVC susceptance in a predetermined frequency band, and means for modifying the estimated reactance based on the correlation.

36. A system as claimed in claim 35, wherein the means for correlating includes first and second bandpass filters for passing signals in the frequency range of 5–20 Hz.

37. A system as claimed in claim 36, further comprising:

means for emphasizing the outputs from the first and second bandpass filters to increase the responsiveness of the means for automatically modifying the estimated reactance.

38. A system as claimed in claim 36, further comprising:

means for weighting output signals from the first and second bandpass filters to increase the responsiveness of the means for automatically modifying the estimated reactance.

39. The system according to claim 36, wherein the means for automatically modifying the estimated reactance further includes:

a correlator for correlating respective outputs of the first and second bandpass filters;

an amplifier for amplifying an output of the combiner; and an integrator for integrating an output of the amplifier to generate the estimated reactance.

40. The system according to claim 33, wherein the SVC includes one or more thyristor-controlled capacitors.

41. The system according to claim 40, wherein the thyristor-controlled capacitor includes in series a capacitor, an inductor, and antiparallel thyristors.

42. The system according to claim 33, further comprising:

means for measuring SVC voltage;

a control unit for calculating gate signals for controlling thyristors in the SVC based on the predicted susceptance value; and detecting means for detecting conduction status of the SVC thyristors and generating the measured SVC susceptance in accordance with the conduction status.

43. The system according to claim 33, wherein the power generation system includes plural phases of power with each phase including an SVC, further comprising:

means for measuring SVC voltages for each phase and averaging the measured SVC phase voltages to provide an average SVC voltage to the calculator, and detecting means for detecting activation status of the SVCs and generating the measured susceptance in accordance with the detected activation status;

wherein the means for controlling includes a firing control unit for receiving the predicted SVC susceptance and calculating control pulses for activating an SVC.

44. The system according to claim 43, further comprising:

a first filter having an associated predetermined delay and connected to the means for modelling for filtering the average SVC voltage, and a second filter, connected to the means for modelling and having substantially the same delay as the predetermined delay, for filtering the measured susceptance.

45. The system according to claim 33, further comprising:

a summer for receiving a reference SVC voltage, and a feedback loop for feeding back the ordered susceptance to the summer through a desensitizing circuit, wherein the summer determines the difference between the reference voltage and an output signal from the desensitizing circuit and provides that difference to the means for predicting.

46. A method for controlling the reactive power in a power system using a static VAR compensator (SVC), comprising:

estimating an equivalent reactance of the power system;

determining an equivalent voltage of the power system based on the estimated reactance; and automatically modifying the estimated reactance in response to changes in the power system.

47. A method as claimed in claim 46, wherein the equivalent voltage is determined based also on measured susceptance and measured voltage of the SVC.

48. A method as claimed in claim 47, wherein the automatic modifying step includes:

correlating the equivalent voltage and the measured SVC susceptance in a predetermined frequency band, and modifying the estimated reactance based on the correlation.

49. An AC power system including a static VAR compensator (SVC) for providing reactive power to the AC power system, comprising:

means for estimating an equivalent reactance of the AC power system;

means for determining an equivalent voltage of the AC power system based on the estimated reactance; and means for automatically modifying the estimated reactance in response to changes in the AC power system.

50. A system as claimed in claim 49, wherein the equivalent voltage is determined based also on measured susceptance and measured voltage of the SVC.

51. A system as claimed in claim 50, wherein the means for automatic modifying includes:

means for correlating the equivalent voltage and the measured SVC susceptance in a predetermined frequency band, and means for modifying the estimated reactance based on the correlation.

52. A system as claimed in claim 51, wherein the means for correlating includes first and second bandpass filters for passing signals in a predetermined frequency range.

53. A system as claimed in claim 52, further comprising:

means for emphasizing output signals from the first and second bandpass filters to increase the responsiveness of the means for automatically modifying the estimated reactance.

54. A system as claimed in claim 53, wherein the means for emphasizing includes:

a multiplier;

means for determining the absolute value of an output of the second bandpass filter; and means for raising an output of the means for determining by an exponent n, where n is a real number greater than 0.

55. A system as claimed in claim 52, further comprising:

means for weighting output signals from the first and second bandpass filters to increase the responsiveness of the means for automatically modifying the estimated reactance.

56. The system according to claim 52, wherein the means for automatically modifying the estimated reactance further includes:

a combiner for combining respective outputs of the first and second bandpass filters;

an amplifier for amplifying an output of the combiner; and an integrator for integrating an output of the amplifier to generate the estimated reactance.

57. A power generation system for controlling reactive power comprising:

an AC power generator for delivering AC power over a transmission line to a load;

a static VAR compensator (SVC) connected at a bus to the transmission line for selectively providing reactive current to the transmission line;

a voltage regulator for regulating voltage at the bus in accordance with a reference voltage;

a calculator for calculating a voltage equivalent to the power generation system based on measured SVC voltage, measured SVC susceptance, and an estimate of an equivalent reactance for the power generation system;

a predictor for predicting a susceptance to be provided by the SVC based on the calculated equivalent voltage; and means for tracking changes in the calculated equivalent voltage and measured SVC susceptance and automatically modifying the estimate of the equivalent reactance in response to those changes.

58. A system as claimed in claim 57, wherein the means for automatic modifying includes:

means for correlating the equivalent voltage and the measured SVC susceptance in a predetermined frequency band, and means for modifying the estimated reactance based on the correlation.

59. A system as claimed in claim 58, wherein the means for correlating includes first and second bandpass filters for passing signals in a predetermined frequency range and further including:

means for emphasizing the outputs from the first and second bandpass filters to increase the responsiveness of the means for automatically modifying the estimated reactance.

60. The system according to claim 59, wherein the means for automatically modifying the estimated reactance further includes:

a combiner for combining respective outputs of the first and second bandpass filters;

an amplifier for amplifying an output of the combiner; and an integrator for integrating an output of the amplifier to generate the estimated reactance.

* * * * *